S. GULICK.
Wheel-Cultivator.
No. 46,349.                        Patented Feb. 14, 1865.
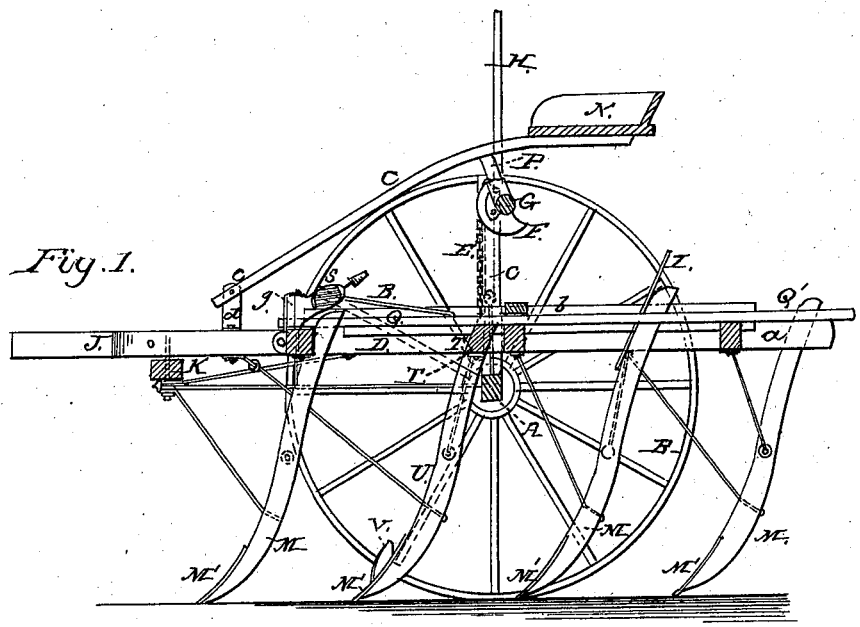
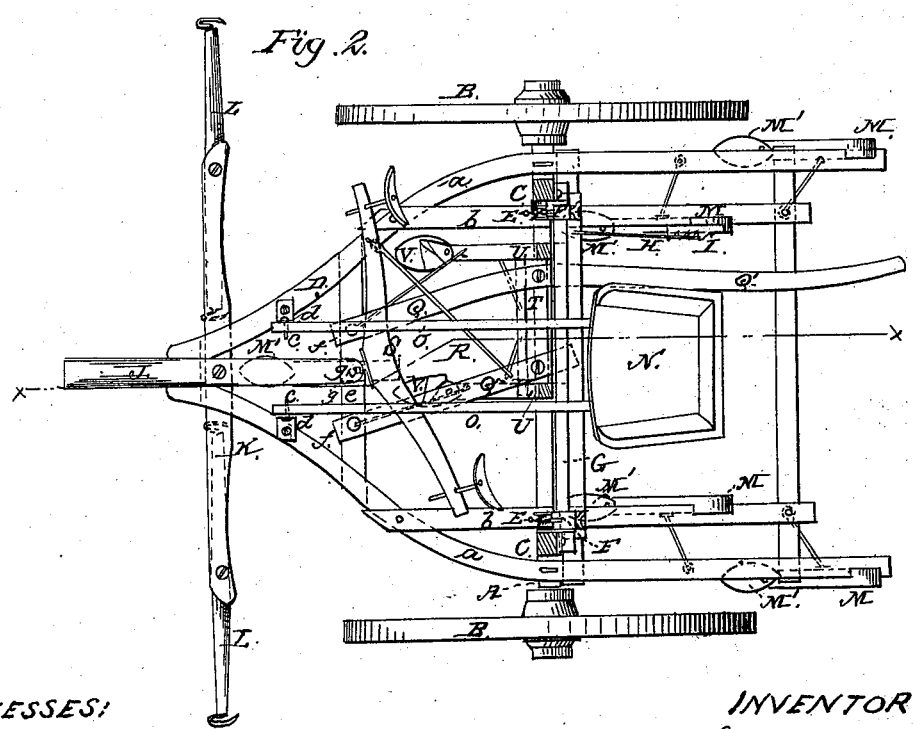
WITNESSES:                  INVENTOR:

UNITED STATES PATENT OFFICE.

SAMUEL GULICK, OF KLINE'S GROVE, PENNSYLVANIA.

IMPROVEMENT IN CULTIVATORS.

Specification forming part of Letters Patent No. 46,349, dated February 14, 1865.

*To all whom it may concern:*

Be it known that I, SAMUEL GULICK, of Kline's Grove, in the county of Northumberland and State of Pennsylvania, have invented a new and Improved Cultivator; and I do hereby declare that the following is a full, clear, and exact description thereof, which will enable those skilled in the art to make and use the same, reference being had to the accompanying drawings, forming part of this specification, in which—

Figure 1 is a side sectional view of my invention, taken in the line $x\ x$, Fig. 2; Fig. 2, a plan or top view of the same.

Similar letters of reference indicate like parts.

This invention relates to a new and improved cultivator of that class which are provided with adjustable plows; and it consists in a novel arrangement of parts, whereby it is believed that advantages are obtained over others now in use as regards facility in operating or adjusting the plows.

A represents an axle, having a wheel, B, at each end of it, and two uprights, C C, attached to it, one near each end.

D is a horizontal frame placed over the axle A, and having the uprights C C passing between the side pieces, $a\ a$, and longitudinal bars $b$ thereof. (See Fig. 2.) This frame D is connected by chains E E to pulleys or part pulleys F F on a shaft, G, which has its bearings at the upper parts of the uprights C C. One of the part pulleys F has a lever, H, attached to it, by which the shaft G may be turned and the frame D raised or lowered, as desired, the frame being retained at any required height by engaging the lever with a notched bar, I, attached to the frame D.

To the front part of the frame D a draft-pole, J, is attached, and to the rear part of the latter there is secured a double-tree, K, with whiffletrees L at its ends, and plow-standards M are also permanently secured to said frame, having plows M', of the usual or any proper form, at their lower ends.

N is the driver's seat, which is at the rear ends of bars O O, the front ends of the latter being attached by pivots $c$ to short uprights $d$ at the front part of the frame D. These bars O O are supported just in front of the seat N by pendants P, having straps at their lower ends, which are fitted loosely on shaft G. By this arrangement the driver's seat is not allowed to interfere with the raising and lowering of the frame D.

Q Q are two bars placed on the frame D, the front ends of the former being attached to a front cross-bar, $e$, of the frame by pivot-bolts $f$. One of these bars Q extends back to the rear of the frame D, forming a handle, Q', and the other bar, Q, is connected by a rod, R, with a foot-lever, S, having a central fulcrum, $g$. The rear ends of the bars Q Q are connected by a transverse bar, T, the ends of which have standards U U attached to them, said standards having plows V at their lower ends.

From the above description it will be seen that the plows V may be moved laterally, either by operating the lever S, which is done by the feet of the driver on seat N, when the former chooses to ride, or by moving the long part or handle Q', when the driver chooses to walk behind the machine. Thus the plows V may be made to conform to the sinuosities of the rows of plants, and all the plows attached to the machine, so as to penetrate the earth to any required depth, or raised entirely free from the ground when required—as, for instance, in drawing the machine from place to place.

I claim as new and desire to secure by Letters Patent—

1. The frame D, fitted on the axle A, and connected by chains or cords E E to part pulleys F F on a shaft, G, which has its bearings on uprights C C, attached to the axle, and which serve as guides for frame D, all being arranged as shown, with a lever and notched bar, or their equivalents, whereby said frame may be raised and lowered bodily and secured at any desired height, for the purpose specified.

2. The pivoted bars Q Q, when applied to and used in combination with the adjustable frame D, substantially as and for the purpose set forth.

SAMUEL GULICK.

Witnesses:
A. L. BRASIUES,
JACOB F. ROHRBACH.